(12) United States Patent
Horstman et al.

(10) Patent No.: US 7,029,744 B2
(45) Date of Patent: Apr. 18, 2006

(54) HIGH TRACTION FLOORING LAMINATE

(75) Inventors: R. Ted Horstman, Fort Jennings, OH (US); David E. Fanning, Fort Jennings, OH (US)

(73) Assignee: Ultimate Systems, Ltd., Delphos, OH (US)

( * ) Notice: Subject to any disclaimer, the term of this patent is extended or adjusted under 35 U.S.C. 154(b) by 77 days.

(21) Appl. No.: 10/422,415

(22) Filed: Apr. 24, 2003

(65) Prior Publication Data

US 2004/0211130 A1    Oct. 28, 2004

(51) Int. Cl.
  E04F 15/00   (2006.01)
  B32B 3/00    (2006.01)
  E01C 5/18    (2006.01)

(52) U.S. Cl. .......... 428/143; 52/181; 52/DIG. 9; 404/20; 404/21; 404/32

(58) Field of Classification Search ........ 52/181, 52/DIG. 9; 428/143; 404/20, 21, 32
See application file for complete search history.

(56) References Cited

U.S. PATENT DOCUMENTS

| | | | | |
|---|---|---|---|---|
| 2,057,171 A | * | 10/1936 | Van Der Pyl | 404/21 |
| 2,871,774 A | * | 2/1959 | Johnson | 264/31 |
| RE25,778 E | * | 5/1965 | Bore et al. | 427/203 |
| 3,227,604 A | * | 1/1966 | Morgan | 428/40.6 |
| 3,446,122 A | * | 5/1969 | Unterstenhoefer et al. | 404/28 |
| 3,650,883 A | * | 3/1972 | Sweeney | 428/143 |
| 3,836,420 A | | 9/1974 | Freese | |
| 4,082,888 A | * | 4/1978 | Portin | 428/327 |
| 4,196,243 A | * | 4/1980 | Sachs et al. | 428/147 |
| 4,341,836 A | | 7/1982 | Becker | 428/308.4 |
| 4,348,447 A | * | 9/1982 | Miller et al. | 428/149 |
| 4,420,513 A | * | 12/1983 | Coke et al. | 427/407.1 |
| 4,501,783 A | * | 2/1985 | Hiragami et al. | 428/147 |
| 4,555,292 A | * | 11/1985 | Thompson | 156/279 |
| 4,614,686 A | * | 9/1986 | Coke et al. | 428/327 |
| 4,622,257 A | * | 11/1986 | Thompson | 428/143 |
| 4,662,972 A | | 5/1987 | Thompson | |
| 4,810,560 A | * | 3/1989 | Sell | 428/192 |
| 5,127,973 A | | 7/1992 | Sengupta et al. | |
| 5,204,159 A | * | 4/1993 | Tan | 428/143 |
| 5,395,673 A | * | 3/1995 | Hunt | 428/148 |
| 5,401,560 A | | 3/1995 | Williams | |
| 5,453,320 A | * | 9/1995 | Harper et al. | 428/356 |
| 5,494,729 A | * | 2/1996 | Henry et al. | 428/147 |
| 5,605,721 A | * | 2/1997 | Di Geronimo | 427/373 |
| 5,714,219 A | * | 2/1998 | Mashunkashey et al. | 428/36.1 |
| 5,736,070 A | * | 4/1998 | Murakami et al. | 252/512 |
| 5,787,655 A | | 8/1998 | Saylor, Jr. | |
| 6,132,844 A | * | 10/2000 | Altshuler et al. | 428/143 |

(Continued)

FOREIGN PATENT DOCUMENTS

CA    2 319 939    *  3/2002

(Continued)

*Primary Examiner*—Robert Canfield
(74) *Attorney, Agent, or Firm*—Hudak, Shunk & Farine Co.

(57) ABSTRACT

The present invention relates to a laminate, preferably a flooring laminate suitable for use wherever traction is needed or desired, whether due to natural or man-made conditions either indoors or outdoors. The laminate can be applied over existing flooring. The laminate includes a base layer and a traction layer including a grit material dispersed on a polymer. The base layer comprises a cured rubber blend which has been granulated to a predetermined size and subsequently rebonded with a polymeric base adhesive composition. At least some portion of the grit material of the traction layer protrudes from the polymeric composition to provide anti-slip properties.

20 Claims, 1 Drawing Sheet

U.S. PATENT DOCUMENTS

| | | | |
|---|---|---|---|
| 6,312,786 B1 * | 11/2001 | Schwinn | 428/143 |
| 6,468,678 B1 * | 10/2002 | Dahlin et al. | 428/692 |
| 6,565,918 B1 * | 5/2003 | Hughes et al. | 427/136 |
| 6,689,239 B1 * | 2/2004 | Grubic | 156/71 |
| 6,709,732 B1 * | 3/2004 | Graab et al. | 428/143 |
| 2002/0168500 A1 * | 11/2002 | Graab et al. | 428/143 |

FOREIGN PATENT DOCUMENTS

| | | | |
|---|---|---|---|
| EP | 0 676 506 A2 | * | 10/1995 |
| JP | 5-141075 | * | 6/1993 |
| JP | 6-313301 | * | 11/1994 |
| JP | 10-315258 | * | 5/1997 |

* cited by examiner

US 7,029,744 B2

HIGH TRACTION FLOORING LAMINATE

FIELD OF THE INVENTION

The present invention relates to a slip-resistant laminate, preferably a flooring laminate suitable for use wherever traction is needed or desired, whether due to natural or man-made conditions either indoors or outdoors. The laminate can be applied over existing flooring. The laminate comprises a base layer and a traction layer bonded thereto including a grit material bonded by a polymer.

BACKGROUND OF THE INVENTION

Hard floor surfaces such as concrete, ceramic tile, asphalt, vinyl tile, finished wood, and the like are generally durable and easily maintained. Accordingly, hard floor surfaces are commonly utilized in high traffic areas as they can withstand years of wear without losing aesthetic appeal. One common problem with hard floor surfaces is that they are slippery and offer little traction. The problems of hard floor surfaces become exacerbated when water, oil, grease, sand, or the like are deposited onto the floor.

The problems associated with hard floor surfaces have been known in the flooring industry for many years. Numerous attempts have been made in the prior art to address the above-noted traction problems of hard floor surfaces.

U.S. Pat. No. 3,836,420 relates to a decorative safety tread applique for use on the floor surfaces of bathtubs, showers, and the like. The applique is provided with a reportedly slip-preventing upper surface and has at least one laterally extending row of indicia-shaped openings therethrough arranged so as to be engageable by the feet of the user to further reportedly preclude accidental slipping. For purposes of advertising, the indicia-shaped openings may be arranged to form the name of a business or the like. The floor of the bathtub or shower is visible through the indicia-shaped openings.

U.S. Pat. No. 4,662,972 relates to methods of forming a reportedly non-skid surface on a base member, wherein the base member may consist of a wood, plastic, metal or concrete surface structure. One method includes applying one or more coats or layers of epoxy resin to one surface of a wood base member. After the epoxy resin is set, a first coat of polyurethane is applied thereover at a thickness determined by the size of the grit material that is disseminated in the first coat of polyurethane, whereby the upper portion of the grit is exposed so as to be covered by a second polyurethane coat applied over the first coat of polyurethane, the grit being locked within and between the two coats of polyurethane. An additional method includes the step of affixing a fiber/cement panel to the base member and applying the first polyurethane coat to the surface of the fiber/cement panel, followed thereafter by the grit and the second coat of polyurethane, whereby a reportedly non-skid surface is established thereon.

U.S. Pat. No. 5,401,560 relates to reportedly non-slip laminatable materials which are provided by coating a polymer sheet backing with mineral particles adhered to the backing by a radiation curable adhesive.

U.S. Pat. No. 5,787,655 relates to a method for manufacturing a decorative reportedly slip-resistant cover system including the step of impacting a softened polymer film with a plurality of beads-such that a section of each bead protrudes from the softened polymer film. The softened polymer film is hardened. The sections of the beads are embedded into an upper layer of the cover system.

SUMMARY OF THE INVENTION

The present invention relates to a laminate having a slip-resistant top surface which is advantageously utilized as a flooring laminate. The laminate is applied over an existing substrate to improve traction. A method for preparing the laminate of the invention is disclosed along with a process for applying the laminate to a substrate.

Laminates of the present invention generally include a traction layer permanently bonded to a base layer. The traction layer includes a grit material dispersed in a polymeric composition which upon curing adheres to the base layer. At least some portion of the grit material protrudes from the polymeric composition to provide anti-slip properties. The base layer comprises a cured rubber blend which has been granulated to a predetermined size and subsequently rebonded with a base adhesive composition. Preferably, the rubber of the base layer is a recycled rubber, having been recovered from a prior operation. Instead of allowing scrap or leftover rubber from a molding or other operation to be sent to a landfill, the rubber is reprocessed and utilized in the present invention laminate. Thus, the present invention promotes recycling and is environmentally friendly.

The laminates of the present invention are relatively flexible and can conform to and bond to the surfaces of substrates which are not completely flat or level. Moreover, due to the particulate structure of the laminate base, the laminate has elastomeric properties and has an inherent cushion effect while providing the stated slip-resistant properties.

DETAILED DESCRIPTION OF THE INVENTION

Figure 1:
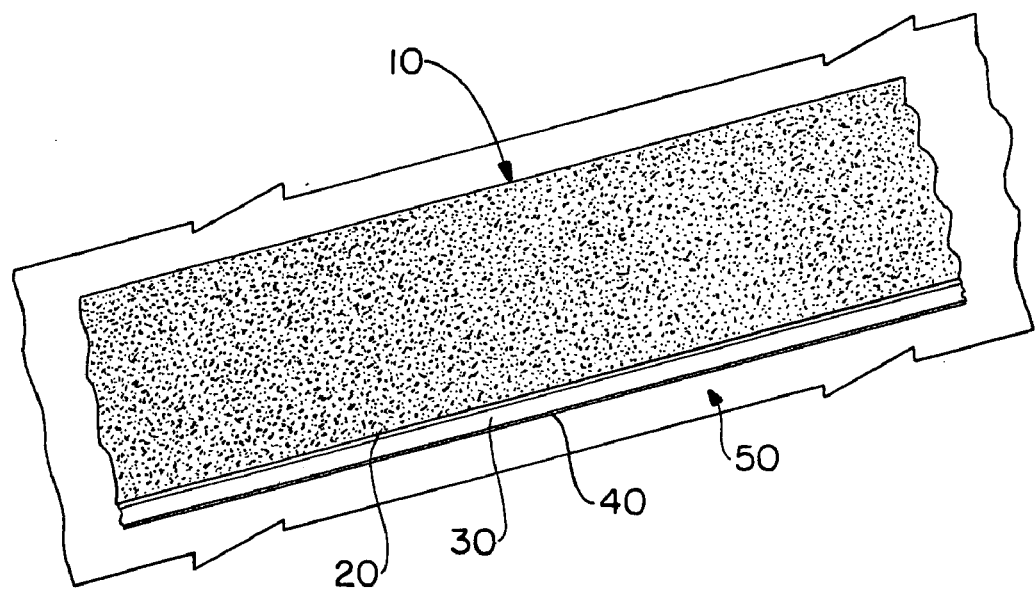
FIG. 1 illustrates a perspective view of a laminate of the present invention adhered to a substrate.

Making reference now to the drawings wherein like numerals indicate like or corresponding parts throughout the several figures, a skid resistant laminate 10 is shown in the Figures. The laminate 10 includes a base layer 30 which is adhered to a substrate 50 through adhesive layer 40 as shown in FIG. 1. Laminate base layer 30 is, in turn, bonded to traction layer 20 which is exposed to the environment and provides slip-resistant properties.

Laminate base layer 30 comprises at least one rubber or elastomer component and is preferably a rubber blend. The rubber component of the base layer is generally made from conventional rubbers well known in the art, or blends thereof, and both natural and/or synthetic rubber can be utilized. Rubbers suitable for use in the base layer include, but are not limited to, rubber or blends derived from one or more conjugated dienes having from 4 to about 12 carbon atoms with specific examples including butadiene, isoprene, pentadiene, hexadiene, octadiene, and the like. The rubbers of the present invention include copolymers of the above-noted conjugated diene monomers with one or more vinyl substituted aromatic monomers containing from 8 to 12 carbon atoms such as styrene, alpha-methyl styrene, t-butyl styrene, and the like. Examples of suitable hydrocarbon rubbers include polybutadiene, polyisoprene, natural rubber, styrene-butadiene rubber, EPDM rubber, nitrile rubber, and the like, or combinations thereof.

The preferred rubber of the base layer of the present invention is a styrene-butadiene rubber-natural rubber blend wherein the natural rubber is present in an amount generally from about 10 to about 90 parts, desirably from about 25 to about 75 parts, and preferably from about 35 to about 45 per 100 parts by weight of total rubber (phr). The styrene-butadiene rubber has a butadiene content generally of from about 30 to about 90 parts, desirably from about 50 to about 85, and preferably from about 70 to about 80 parts per 100 parts by weight of the styrene-butadiene rubber.

The rubber 32 of the base layer 30 can include various types of rubber additives in various amounts as known in the art. Such additives include, but are not limited to, processing aids, pigments, antioxidants, waxes, oils, curing agents, accelerators, and the like.

The rubber of the present invention is cured or vulcanized as known in the art. While virgin rubber, i.e., processed or produced specifically for use in the base layer of the invention, can be utilized, it is preferred that the base layer is made from recycled rubber. By recycled rubber it is meant that the rubber has been prepared for and/or previously used in some other process or article. For example, the recycled rubber in some embodiments is the scrap or leftover rubber from a molding process or recovered from a buffing process on a tire carcass, or the like. Accordingly, the rubber or sources of the rubber for the base layer of the invention are numerous.

In a preferred embodiment the rubber component utilized in the base layer has a specific gravity generally from about 1.02 to about 1.30, desirably from about 1.05 to about 1.25, and preferably from about 1.10 to about 1.20.

To form the base layer 30 of the present invention, the cured rubber is processed into particles such as, but not limited to, granules, chips, flakes, or the like, preferably by an ambient process. The rubber is preferably ground or granulated with a granulator to form relatively small random sized particles. The size of the rubber particles range generally from about 4 to about 20 mesh, desirably from about 6 to about 18 mesh, and preferably from about 8 to about 16 mesh, i.e., U. S. standard mesh. Granulators such as those made by Cumberland, Nebmore, and the like as known to the art can be utilized.

After the cured rubber has been granulated or otherwise reduced to an appropriate size, it is rebonded with a binder or base adhesive composition 34. Suitable base adhesive compositions comprise various inorganic compounds, and natural and synthetic polymers such as epoxies, hydrocarbon resins, acrylates, cements and polyurethanes, with polyurethanes being preferred. Polyurethanes are preferred because they are thermosetting and provide a strong bond to the ground, cured rubber forming the base layer. Generally any conventional curable adhesive such as polyurethane as well as those known to the art and to the literature can be utilized. Base adhesive compositions are commercially available from Mobay Corporation, Ciba-Giegy Corporation, or Dow Chemical Company. A preferred polyurethane adhesive is available from Conica Technik of Germany as Conipur 360.

Once the rubber component has been granulated or reduced to the desired particulate size, the base adhesive is mixed therewith. The rubber and base adhesive can be mixed in generally any manner such as through agitation, stirring, kneading, or the like as known to one skilled in the art. The amount of base adhesive utilized ranges generally from about 1 to about 50 parts by weight, desirably from about 2 to about 20 parts by weight, and preferably from about 5 to about 12 or about 15 parts by weight per 100 parts by weight of rubber. Once the mixing operation has been completed, the material is shaped to desired dimensions before curing, such as by being transferred to a mold or other suitable apparatus, wherein the material is pressed and compacted, optionally repeatedly, until predetermined dimensions have been achieved. Afterwards, the rubber-adhesive blend of the base layer is cured. The base adhesive can be cured as known in the art, such as by heating at an elevated temperature for a predetermined period of time. One suited method to cure the base adhesive composition is in a hot air oven at about 150° F. to about 350° F., and desirably from about 200° F. to about 300° F., and preferably about 250° F. for about 0.5 to about 3 or about 4 hours, and preferably about 2 hours.

Once cured, the base layer material can be utilized as is or further cut, formed or fashioned to desired dimensions. In a preferred embodiment, a cutting device such as an F & K Splitter from Fecken-Kirfel Machine of Acken, Germany is utilized to cut and properly dimension the base layer. The base layer at this point in the process in one embodiment is formed into rolls from about 0.5 or about 1 to about 6 feet wide, desirably from about 2 to about 4 feet wide, wherein the rolls have a length of about 50 to about 1,000 feet, and preferably from about 150 to about 600 feet. The base layer has a thickness which ranges generally from about 0.5 or 1 to about 30 millimeters, desirably from about 1.5 or about 2 to about 20 millimeters, and preferably from about 4 to about 12 millimeters. After the traction layer has been bonded to the base layer, the roll can be cut into any suitable length desired by the end user, which typically depends on the end use application.

Figure 2:
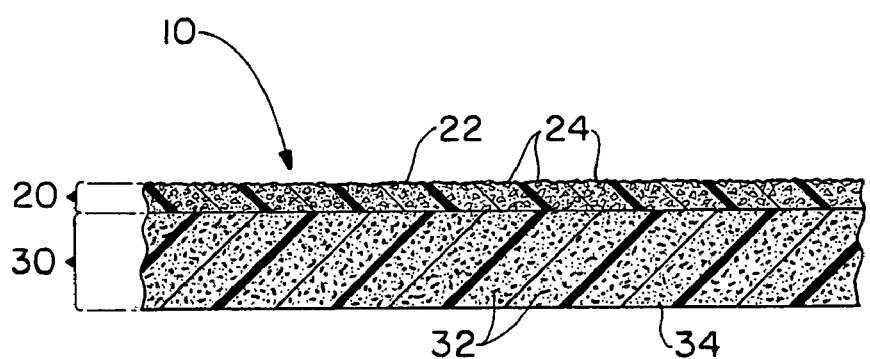
FIG. 2 illustrates a cross-section of a laminate constructed according to the present invention.

Once the base layer 30 has been fabricated, a slip-resistant traction layer 20 is formed thereon as shown in at least FIG. 2. To form the traction layer 20, a polymeric traction layer adhesive composition 22, preferably a thermosetting composition is applied on the base layer. Examples of suitable traction layer adhesive compositions include, but are not limited to, preferably thermosetting adhesive compositions comprising various natural and synthetic polymers such as epoxies, hydrocarbon resins, acrylates, and polyurethanes, with polyurethane being preferred. Suitable traction layer adhesives are commercially available from Mobay Corporation, Ciba-Giegy Corporation, or Dow Chemical Company. A preferred polyurethane is available from ChemRex as CX941. The thickness of the adhesive composition of the traction layer when applied to the base layer ranges generally from about 0.5 mm (0.020 in) to about 2.0 mm (0.080 in) or about 5.0 mm (0.20 in), desirably from about 0.64 mm (0.025 in) to about 1.0 mm (0.040 in) or about 1.5 mm (0.06 in), and preferably from about 0.75 mm (0.030 in) to about 0.90 mm (0.035 in). The thickness of the traction layer is normally determined by the size and type of grit material utilized therein.

The polymeric composition 22 can be applied to the base layer by any method known in the art such as, but not limited to, spraying, air knifing, curtain coating, and roll coating, with roll coating being preferred.

The grit material 24 of the traction layer can be either organic or inorganic. Organic materials include polymeric beads or particles. Inorganic materials include mineral particles, ceramics, and the like, and mixtures thereof. Preferred grit materials are metal oxides including magnesium oxide, silicon oxide, and aluminum oxide, with magnesium oxide being most preferred. The grit material utilized can generally be a single size or distribution of various size particles which range generally from about 10 to about 100 mesh, desirably from about 15 to about 50 mesh, and preferably from about 20 to about 40 mesh (U.S. standard).

While the grit material 24 in one embodiment is mixed into the polymeric traction layer adhesive composition before it is applied to base layer 30, desirably the grit material 24 is applied to the surface of the uncured polymeric adhesive composition forming the laminate traction layer. The grit material 24 of the traction layer 20 can be applied to the polymeric composition 22 by any suitable means. The grit material will adhere to the polymeric traction layer adhesive composition due to the adhesive quality thereof. The grit material is preferably applied by being dropped in suitable amounts from a dispenser, hopper, or the like. The grit material is randomly dispersed on the traction layer adhesive, with some grit material migrating down towards the base layer and some grit material remaining substantially above, i.e., exposed on, the adhesive surface. The amount of the traction layer adhesive composition 22 in the traction layer ranges generally from about 3 to about 40 parts by weight, desirably from about 5 to about 20 parts by weight, and preferably from about 7 to about 13 parts by weight, based on 100 parts by weight of the traction layer (traction layer adhesive composition plus grit material).

After the grit material has been applied to the traction layer adhesive composition 22 of traction layer 20, laminate 10 is preferably heated to a predetermined temperature in order to cure the polymeric adhesive composition of traction layer 20 and thus permanently bond the grit material therein to produce the laminate 10 of the present invention which is suitable for use. The traction layer of the laminate is preferably cured in an oven or other like apparatus at a temperature generally from about 100° F. to about 350° F., and preferably from about 225° F. to about 275° F. for a suitable period of time to effect or cure, such as about 1 to about 6 hours, and preferably about 2 hours.

Upon curing of the polymeric adhesive composition 22 of the traction layer, the base layer and the traction layer are permanently bonded. The overall thickness of the traction layer ranges generally from about 0.5 mm (0.020 in) to about 2.55 mm (0.10 in) or about 5.0 mm (0.20 in), desirably from about 0.75 mm (0.030 in) to about 2.0 mm (0.080 in), and preferably from about 1.28 mm (0.050 in) to about 1.8 mm (0.070 in).

As can be seen in the cross-sectional view of FIG. 2, grit material 24 is dispersed or suspended in the traction layer 20, generally randomly. The grit materials are at least partially bound in and partially protrude from the polymeric coating composition 22 of the traction layer to provide slip or skid resistance.

Suitable adhesives for substrate adhesive layer 40 which adheres the base layer 30 of laminate 10 to a substrate 50 include epoxies and polyurethanes preferably two-part adhesives mixed shortly before use. Preferred substrate adhesives are available from Tennessee Adhesives and Vision Adhesives. Preferably the substrate adhesive layer 40 is resistant to water and has a sufficient bond strength selected to bond to the base layer as well as the desired substrate. The substrate adhesive composition 40 in one embodiment is chosen so that the same is curable under ambient conditions. As is known in the art, the substrate adhesive composition is applied to the substrate by methods including, but not limited to, hand trowelling, spraying, brushing or the like. Thicknesses of the adhesive composition can vary but is generally from about 0.01 to about 1 mm, 0.025 mm to about 0.5 mm, and preferably from about 0.05 to about 0.10 mm.

The traction improving laminate 10 of the present invention is advantageously utilized anywhere where it is desirable to increase the traction of a substrate.

The slip-resistant laminate is applied to substrates either indoors or outdoors and is flexible and conformable to many surfaces such as, but not limited to, concrete, tile, asphalt, wood, vinyl, and metal.

The laminate 10 can be bonded to a substrate through a suitable adhesive layer 40 as illustrated in FIG. 1. Importantly, the laminates of the present invention are dimensionally stable. The overall thickness of the laminate 10 ranges generally from about 1.0 mm (0.040 in) to about 13.0 mm (0.51 in), desirably from about 2.5 mm (0.10 in) to about 8.00 mm (0.31 in), and preferably from about 5.0 mm (0.20 in) to about 6.5 mm (0.26 in).

The laminate of the present invention has excellent slip-resistant properties and has a static coefficient of friction as measured by ASTM C1028-96 of generally at least 0.50, desirably at least 0.80, and preferably at least 0.90 wet or dry. Moreover, the laminate is durable and not easily subject to abrading forces. Thus, the laminate can be used in high traffic areas or other harsh environments. The laminates of the invention have an abrasion resistance as measured by ASTM D3884, H-18 abrasion wheel at 500 grams and 1000 cycles, weight loss of generally less than 5%, desirably less than 3% or 2% and preferably less than 1% or 0.5%. Moreover, the slip-resistant laminate is dimensionally stable and has a dimensional change as measured by Federal Standard 501A Method 6211 of generally less than about 5%, desirably less than about 3%, and preferably less than about 1%.

The present invention will be better understood by reference to the following examples which serve to describe, but not to limit, the present invention.

EXAMPLE

The laminate of the present invention was formed and tested as follows: to form a base layer, styrene-butadiene rubber-natural rubber blend (60 parts SBR, 40 parts NR per 100 parts total rubber) having a styrene content of 23.5 parts per 100 total parts SBR was collected as cured scrap rubber from a buffing operation performed on a tire carcass. The recovered rubber was granulated in a granulator to a particle size between 8 and 16 mesh. The granulated rubber was mixed with a polyurethane adhesive Conipur 360 available from Conica Technik in an amount of 8 parts by weight of adhesive per 100 parts by weight of rubber. After the mixture was thoroughly mixed in a ribbon mixer and adhesive dispersed, the base layer material was transferred into a steel mold where the material was pressed and compacted to a thickness of 1 meter thick. The base layer adhesive was cured in the mold at a temperature of 260° F. for 8 hours and subsequently demolded. The cured material was cut in a F & K Splitter to produce a base layer having a thickness of 3.26 millimeters.

To form the traction layer, a polymeric polyurethane adhesive composition from ChemRex as CX941 was applied to one surface of the base layer at a thickness of 0.80 mm. Magnesium oxide grit material in a size range between 20 and 40 mesh was then applied to the polyurethane by gravity dispersion. The laminate was transferred to a curing oven and the traction layer adhesive cured at a temperature of 250° F. for a period of 2 hours. The polyurethane of the traction layer was utilized in an amount of 10 parts by weight per 100 parts weight of the traction layer (polyurethane and grit material). The grit materials were bound in the adhesive of the traction layer and protruded therefrom, thereby providing a slip-resistant high traction laminate. The laminate had an overall thickness of 4.76 mm. The laminate was adhered to a test section of a concrete substrate with a two-part epoxy substrate adhesive from Tennessee Adhesives at a thickness sufficient to produce a strong bond. Various individuals walked on the laminate with various shoe types. All found the laminate to provide excellent traction and slip-resistance when compared to the original concrete.

The following properties were measured by tests performed on the laminate of the present invention produced as described in this section.

Test 1

Test Method—ASTM C1028-96 Static Coefficient of Friction by the Horizontal Dynamometer Pull-Meter Method A neolite heel assembly with a fifty pound load was pulled horizontally with a dynamometer to measure the force required to cause the assembly to slip on the laminate. After the sample was tested, measurements were calculated and reported as the static coefficient of friction.

| Test 1 Results | |
| --- | --- |
| Heel Assembly Condition | Static Coefficient of Friction |
| Wet | .91 |
| Dry | .96 |

Test 2

Test Method—ASTM D3884 Abrasion Resistance of Textile Fabrics (RPDH) Method

The laminate was subjected to the rubbing action of two abrading wheels under controlled conditions of pressure and abrasive action. The abrasion wheels rest on the surface of the laminate which was mounted on a rotating platform. Turning of the platform initiated the abrasive action on the laminate.

| Test 2 Results | |
| --- | --- |
| Abrasion Wheel | H-18 |
| Load Applied | 500 Grams |
| Number of Cycles | 1,000* |
| Original Weight (grams) | 34.62 |
| Final Weight (grams) | 34.48 |
| Weight Loss | 0.14 (0.4%) |

Test 3

Test Method—ASTM D395 Compression Set Method B

The laminate was compressed to a specified deflection and maintained under this condition for a specified time and at a specified temperature. The laminate tested at 25% deflection for a 22 hour deflection period in an air circulating oven at 158° F. The laminate was removed from the oven and subsequently measured for thickness loss after a thirty minute cooling period.

Test 3 Results

The compression set tested at 25% deflection for the laminate is 11.1%.

Test 4

Test Method—Federal Standard 501A Method 6211: Dimensional Stability

This test method was used in determining the linear change of resilient laminate flooring after being exposed to heat as determined by the test method. The largest dimensional change was reported as the dimensional stability.

| Test 4 Results | |
| --- | --- |
| Average Dimensional Change | .025 inch (0.21%) |

In accordance with the patent statutes, the best mode and preferred embodiment have been set forth, the scope of the invention is not limited thereto, but rather by the scope of the attached claims.

What is claimed is:

1. A slip-resistant laminate, comprising:
   a base layer comprising (a) particles of at least one cured recycled rubber and (b) a base adhesive composition, said base adhesive composition binding said cured rubber particles together; and
   a traction layer adhered to said base layer, said traction layer comprising a cured traction layer adhesive composition and a grit material, wherein at least a portion of said grit material is exposed on an upper surface of said traction layer to provide slip-resistant properties to said laminate wherein the base adhesive composition is present in an amount from about 2 to about 20 parts by weight per 100 parts of the rubber particles, wherein said rubber particles are about 6 mesh to about 18 mesh, wherein said base layer has a thickness from about 4 mm to about 12 mm, wherein said grit material is about 20 to about 40 mesh, wherein said traction layer adhesive composition is present in an amount from about 5 to about 20 parts by weight based on 100 parts by weight of the traction layer adhesive composition and grit material, and wherein said traction layer has a thickness of from about 0.75 mm to about 2 mm.

2. The slip-resistant laminate according to claim 1, wherein said laminate has a thickness of about 1.0 mm to about 13.0 mm, and wherein said grit material comprises organic particles, inorganic particles, or a combination thereof.

3. The slip-resistant laminate according to claim 2, wherein said base layer rubber particles are derived from one or more conjugated dienes having from 4 to about 12 carbon atoms, natural rubber, a copolymer of said at least one conjugated diene monomer with one or more vinyl substituted aromatic monomers containing from 8 to about 12 carbon atoms, EPDM rubber, nitrile rubber, or combinations thereof.

4. The slip-resistant laminate according to claim 3, wherein said base adhesive composition is an epoxy, hydrocarbon resin, acrylate, cement, polyurethane, or a combination thereof.

5. The slip-resistant laminate according to claim 4, wherein said grit material comprises polymeric beads, polymeric particles, mineral particles, ceramics, or metal oxides, or a combination thereof.

6. The slip-resistant laminate according to claim 5, wherein said grit material is a metal oxide, and wherein said traction layer adhesive composition is a polyurethane or an epoxy.

7. The slip-resistant laminate according to claim 6, wherein said grit material comprises magnesium oxide, and wherein said grit material has a size of about 15 mesh to about 50 mesh.

8. The slip-resistant laminate according to claim 5, wherein said cured traction layer adhesive composition is polyurethane, wherein said rubber particles are a recycled styrene-butadiene rubber and natural rubber blend, wherein said styrene-butadiene rubber has a butadiene content of from about 30 to about 90 parts per 100 parts by weight of the styrene-butadiene rubber.

9. The slip-resistant laminate according to claim 8, wherein said base layer has a thickness from about 1 to about 30 millimeters, wherein said traction layer has a thickness from about 0.5 mm to about 5 mm.

10. The slip-resistant laminate according to claim 1, wherein said laminate has a static coefficient of friction of at least 0.080 either wet or dry.

11. A slip-resistant laminate, comprising:
a base layer comprising (a) particles of at least one cured recycled rubber and (b) a base adhesive composition, said base adhesive composition binding said cured rubber particles together; and
a traction layer adhered to said base layer, said traction layer comprising a cured traction layer adhesive composition and a grit material, wherein at least a portion of said grit material is exposed on an upper surface of said traction layer to provide slip-resistant properties to said laminate, and wherein said base adhesive composition is an epoxy, hydrocarbon resin, acrylate, cement, polyurethane, or a combination thereof wherein said grit material comprises polymeric beads, polymeric particles, mineral particles, ceramics, or metal oxides, or a combination thereof, wherein said cured traction layer adhesive composition is polyurethane, wherein said rubber particles are a recycled styrene-butadiene rubber and natural rubber blend, wherein said styrene-butadiene rubber has a butadiene content of from about 30 to about 90 parts per 100 parts by weight of the styrene-butadiene rubber, wherein said rubber particles have a size from about 4 to about 20 mesh, and wherein said base adhesive composition is used in an amount from about 2 to about 20 parts by weight per 100 parts by weight of rubber.

12. A method for forming a slip-resistant laminate comprising the steps of:
forming a base layer comprising particles of at least one cured rubber and a base adhesive composition, said base adhesive composition binding said cured rubber particles together;
forming a traction layer on said base layer, wherein said traction layer comprises an uncured traction layer adhesive composition and a grit material, by applying the uncured traction layer adhesive composition on a surface of the base layer and applying the grit material on an upper surface of the uncured traction layer adhesive composition, wherein at least a portion of said grit material is exposed on the upper surface of said traction layer to provide slip-resistant properties to said laminate; and
curing the traction layer adhesive.

13. The method according to claim 12, wherein said laminate has a thickness of about 1.0 mm to about 13.0 mm, and wherein said grit material comprises organic particles, inorganic particles, or a combination thereof, wherein the grit material is gravitationally dispersed on the traction layer adhesive composition.

14. The method according to claim 13, wherein said laminate base layer rubber particles are derived from one or more conjugated dienes having from 4 to about 12 carbon atoms, natural rubber, a copolymer of said at least one conjugated diene monomer with one or more vinyl substituted aromatic monomers containing from 8 to about 12 carbon atoms, EPDM rubber, nitrile rubber, or combinations thereof, wherein said base adhesive composition is cured at a temperature from about 100° F. to about 350° F. for a predetermined time.

15. The method according to claim 14, wherein said rubber particles have a size from about 6 to about 20 mesh, and wherein said base adhesive composition is an epoxy, hydrocarbon resin, acrylate, cement, polyurethane, or a combination thereof.

16. The method according to claim 15, wherein said grit material comprises polymeric beads, polymeric particles, mineral particles, ceramics, or metal oxides, or a combination thereof.

17. The method according to claim 16, wherein said grit material is a metal oxide, wherein said traction layer adhesive composition is a polyurethane or an epoxy, and wherein said traction layer adhesive composition is applied on said base layer and said grit material is applied to said traction layer adhesive composition to form said traction layer.

18. The method according to claim 17, wherein said grit material comprises magnesium oxide, wherein said grit material has a size of about 15 mesh to about 50 mesh, wherein said rubber particles have been granulated, and wherein said traction layer adhesive composition is cured at a temperature of about 100° F. to about 350° F. for a predetermined time.

19. The method according to claim 16, wherein said cured traction layer adhesive composition is a polyurethane, wherein said rubber particles are a recycled styrene-butadiene rubber and natural rubber blend, wherein said styrene-butadiene rubber has a butadiene content of form about 30 to about 90 parts per 100 parts by weight of the styrene-butadiene rubber, wherein said rubber particles have a size from about 4 to about 20 mesh, and wherein said base adhesive composition is used in an amount from about 2 to about 20 parts by weight per 100 parts by weight of rubber.

20. The method according to claim 19, wherein said base layer has a thickness from about 1 to about 30 millimeters, wherein said traction layer has a thickness from about 0.5 mm to about 5 mm, wherein the traction layer adhesive composition is applied to the base layer by spraying, air knifing, curtain coating or roll coating.

* * * * *